United States Patent Office 3,486,915
Patented Dec. 30, 1969

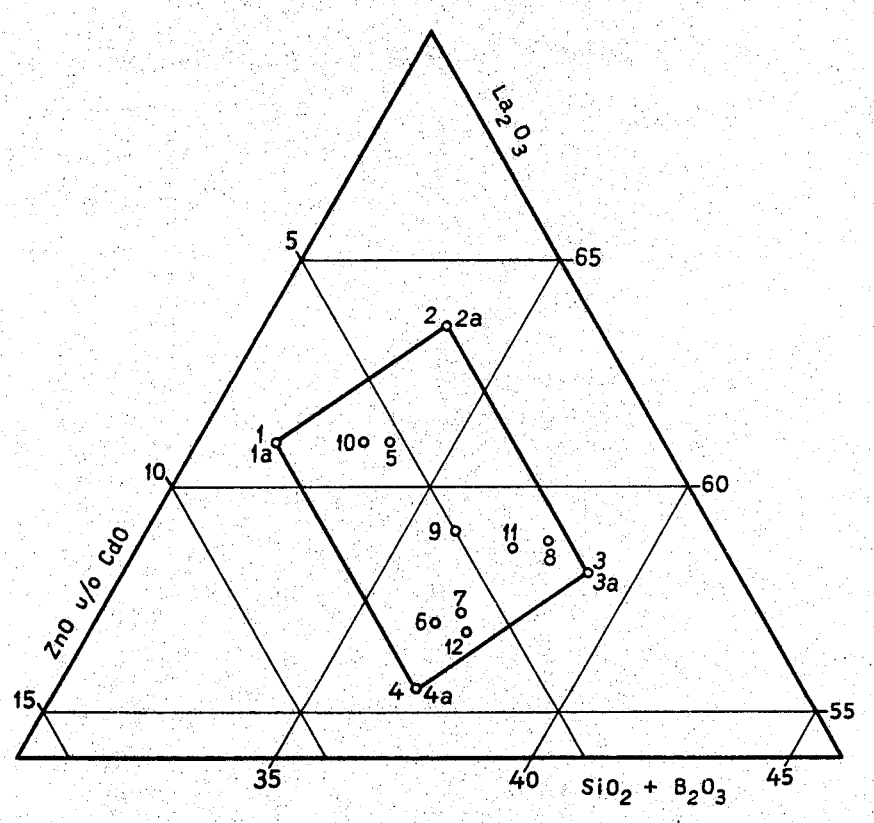

3,486,915
OPTICAL GLASS
Heinz Bromer and Norbert Meinert, Wetzlar (Lahn),
Germany, assignors to Ernst Leitz G.m.b.H., Wetzlar
(Lahn), Germany, a corporation of Germany
Continuation of application Ser. No. 352,550, Mar. 17,
1964. This application Apr. 10, 1969, Ser. No. 816,179
Int. Cl. C03c *3/30;* G02b *1/00*
U.S. Cl. 106—54        4 Claims

ABSTRACT OF THE DISCLOSURE

Optical glass with values of refractive indices from about $n_e=1.78$ and an Abbé value $v_e=48.0$ to indices of refraction of $n_e=1.855$ with an Abbé value $v_e$ of about 43, said glass having at least 80% of a glass base of the composition in the rectangle in the accompanying drawing and containing as additives thereto: $ZrO_2$; $Ta_2O_5$ and $WO_3$.

---

This is a continuation of copending application Ser. No. 352,550, filed Mar. 17, 1964, and now abandoned.

Our invention relates to optical glasses with high indices of refraction and relatively low dispersions. It is particularly concerned with an optical glass with values from about $n_e=1.78$ and an Abbé value $v_e=48.0$ to indices of refraction of $n_e=1.855$ with an Abbé value $v_e$ of about 43.

Optical glasses with the above mentioned values are required for especially high value objectives. To this end repeated researches have already been made to melt glasses of this type. Assertions of these are found, for example, in German Patent 1,008,456 and German published applications 1,021,139 and 1,070,794. The glasses in these mentioned publications are, however, in general very difficult to melt because of their tendency toward crystallization. Added to this, because of the raw materials for their preparation, they are very expensive. For this reason recently there has been required glass mixes whereby one can produce glasses in continuous or semi-continuous melting- and casting processes to attain a lower production cost.

The glass mixes given in the following disclosures afford this advantage since they show substantially no inclination toward crystallizing out in the temperature range required for their working. A further advantage of glasses to be melted from these mixes is that they are capable of being pressed. Furthermore, it can be noted that the glasses exhibit a high chemical stability. The tantalum content of the glasses is relatively low, which works advantageously as to price, since tantalum oxide belongs to the most expensive raw materials for glass production.

In the above mentioned German published application 1,021,139 glasses are described which consist essentially of boric oxide, lanthanum oxide, zirconium oxide, and tantalum oxide as well as zinc and/or cadmium oxide in which the mol ratio of boric oxide to lanthanum oxide lies between 2.5 and 3.6, the mol ratio of the oxides of the bi-valent elements to lanthanum oxide lies between 0.35 and 0.9 and the mol ratio of the sum of the oxides of the four-valent and five-valent elements to lanthanum oxide lies between 0.2 and 0.45. The sum of the given ratio numbers must accordingly amount to between 3.3 and 4.9. Expressed in percent by weight, the amounts of the several oxides must necessarily lie within the following limits:

|  | Percent by weight |
|---|---|
| $B_2O_3$ | 27–33 |
| $CdO$ | 7.5–15 |
| $La_2O_3$ | 42–52 |
| $ZrO_2$ | 2.0–6.5 |
| $Ta_2O_5$ | 3.5–7.0 |

Surprisingly, we have found that these glasses are essentially more stable against crystallizing out when the amount of bi-valent oxides is decreased and the amount of zirconium oxide accordingly increased. Thereby the boric oxide can be substituted to an amount of 5% by silica, whereby the glasses are still more chemically resistant. Furthermore the range of viscosity is thereby more favorable for continuous and semicontinuous melting processes. The glasses made according to our invention are thereby characterized in that the amounts of boric oxide and silica, lanthanum oxide and zinc and/or cadmium oxide lie in a ternary diagram of these substances within the following boundaries:

| | | | | |
|---|---|---|---|---|
| $B_2O_3+SiO_2$ | 31.5 | 33.5 | 39.0 | 37.0 |
| $La_2O_3$ | 61.0 | 63.6 | 58.1 | 55.5 |
| ZnO and/or CdO | 7.5 | 2.9 | 2.9 | 7.5 |

The glass mixture should contain from 80% to 88% of these constituents. The remaining 12% to 20% by weight consists, acording to the invention, of

|  | Percent by weight |
|---|---|
| $ZrO_2$ | 7.5–12 |
| $Ta_2O_5$ | 2–7 |
| $WO_3$ | 1–7.5 |

In the accompanying drawing the corresponding region is designated for the main constituents which are listed in the above table. This region lies well outside the range disclosed in the published German application 1,021,139 as also beyond the vitreous region given in U.S. Patent 2,430,540 for the ternary system $CdO$, $B_2O_3$, $La_2O_3$.

In the following table are given some examples of glasses according to the invention with their mix compositions and optical data:

TABLE 1

| Melt No. | B 1147 | B1 151 | B1 148 | B1 152 | B1 149 |
|---|---|---|---|---|---|
| $SiO_2+B_2O_3{}^1$ | 31.50 | 31.50 | 33.50 | 33.50 | 39.00 |
| $La_2O_3{}^1$ | 61.00 | 61.00 | 63.60 | 63.60 | 58.10 |
| $ZnO+CdO{}^1$ | 7.50 | 7.50 | 2.90 | 2.90 | 2.90 |
| $SiO_2$ | 5.00 | 2.50 | 2.50 | 5.00 | ------ |
| $B_2O_3$ | 20.80 | 25.00 | 25.00 | 24.20 | 32.00 |
| $ZnO$ | 1.20 | 1.60 | ------ | ------ | 2.40 |
| $CdO$ | 5.00 | 5.00 | 2.40 | 2.50 | ------ |
| $La_2O_3$ | 50.00 | 53.20 | 52.20 | 55.40 | 47.70 |
| $ZrO_2$ | 7.50 | 7.50 | 12.00 | 7.50 | 9.90 |
| $Ta_2O_5$ | 3.00 | 4.30 | 4.90 | 2.00 | 7.00 |
| $WO_3$ | 7.50 | 1.00 | 1.00 | 3.40 | 1.00 |
| $MgO$ | | | | | |
| $CaO$ | | | | | |
| $SrO$ | | | | | |
| $BaO$ | | | | | |
| $PbO$ | | | | | |
| $Al_2O_3$ | | | | | |
| $TiO_2$ | | | | | |
| $n_e$ | 1.8327 | 1.8140 | 1.8283 | 1.8098 | 1.8029 |
| $v_e$ | 42.9 | 46.3 | 45.5 | 46.3 | 46.7 |
| Glass No. in diagram | 1 | 1a | 2 | 2a | 3 |

[1] On 100%.

TABLE 2

| Melt No | B1 153 | B1 150 | B1 154 | 8.21 450/T 3 |
|---|---|---|---|---|
| $SiO_2+B_2O_3$ [1] | 39.00 | 37.00 | 37.00 | 33.70 |
| $La_2O_3$ [1] | 58.10 | 55.50 | 55.50 | 61.00 |
| $ZnO+CdO$ [1] | 2.90 | 7.50 | 7.50 | 5.30 |
| $SiO_2$ | | | | 4.53 |
| $B_2O_3$ | 33.90 | 29.60 | 32.20 | 23.70 |
| ZnO | 2.50 | 5.00 | 3.30 | 2.64 |
| CdO | | 1.20 | 3.30 | 1.80 |
| $La_2O_3$ | 50.50 | 45.50 | 48.30 | 5.110 |
| $ZrO_2$ | 10.00 | 8.00 | 7.50 | 9.06 |
| $Ta_2O_5$ | 2.10 | 4.00 | 4.00 | 2.64 |
| $WO_3$ | 1.00 | 6.70 | 1.40 | 4.53 |
| $n_e$ | 1.7829 | 1.8029 | 1.7883 | 1.8122 |
| $v_e$ | 48.5 | 44.5 | 47.7 | 45.3 |
| Glass No. in diagram | 3a | 4 | 4a | 5 |

[1] On 100%.

TABLE 3

| Melt No | LeCP/T 35 | LeCP/T 34 | LeCP/T 28 | B1 155 |
|---|---|---|---|---|
| $SiO_2+B_2O_3$ [1] | 36.60 | 37.00 | 37.90 | 36.00 |
| $La_2O_3$ [1] | 57.00 | 57.20 | 58.80 | 59.00 |
| $ZnO+CdO$ [1] | 6.40 | 5.80 | 3.30 | 5.00 |
| $SiO_2$ | 2.50 | | 5.00 | 2.50 |
| $B_2O_3$ | 29.00 | 31.70 | 28.50 | 27.30 |
| ZnO | 1.50 | 1.00 | | 1.00 |
| CdO | 4.00 | 4.00 | 2.80 | 3.20 |
| $La_2O_3$ | 49.00 | 48.80 | 49.60 | 49.00 |
| $ZrO_2$ | 9.00 | 8.80 | 8.10 | 7.50 |
| $Ta_2O_5$ | 3.50 | 4.00 | 2.30 | 2.00 |
| $WO_3$ | 1.50 | 1.70 | 2.00 | 2.50 |
| CaO | | | 1.70 | |
| PbO | | | | 5.0 |
| $n_e$ | 1.7952 | 1.7957 | 1.7897 | 1.8080 |
| $v_e$ | 46.8 | 47.1 | 46.9 | 44.6 |
| Glass No. in diagram | 6 | 7 | 8 | 9 |

[1] On 100%.

TABLE 4

| Melt No. | Bl 156 | Bl 157 | Bl 158 | Bl 159 |
|---|---|---|---|---|
| $SiO_2+B_2O_3$ [1] | 33.20 | 37.30 | 37.30 | 32.20 |
| $La_2O_3$ [1] | 61.00 | 58.60 | 56.80 | 61.90 |
| $ZnO+CdO$ [1] | 5.80 | 4.10 | 5.90 | 2.90 |
| $SiO_2$ | 2.50 | | 1.50 | 2.00 |
| $B_2O_3$ | 25.50 | 31.50 | 30.00 | 26.8 |
| ZnO | | | 2.00 | 0.40 |
| CdO | 5.00 | 3.50 | 3.00 | 2.00 |
| $La_2O_3$ | 51.50 | 49.50 | 48.00 | 50.50 |
| $ZrO_2$ | 7.50 | 7.50 | 7.50 | 10.0 |
| $Ta_2O_5$ | 2.00 | 2.00 | 2.00 | 5.50 |
| $WO_3$ | 1.00 | 1.00 | 1.00 | 2.80 |
| MgO | | | 1.5 | |
| CaO | | 2.50 | | |
| SrO | | 2.50 | | |
| BaO | | | | |
| PbO | | | | |
| $Al_2O_3$ | | | 3.5 | |
| $TiO_2$ | 5.00 | | | |
| $n_e$ | 1.8431 | 1.7861 | 1.7595 | 1.8160 |
| $v_e$ | 40.3 | 48.2 | 50.0 | 45.3 |
| Glass No. in diagram | 10 | 11 | 12 | 13 |

[1] On 100%.

The optical values can be varied still further if one introduces into the mixture alkaline earth oxides (with the exception of beryllium oxide and radium oxide), aluminum oxide, titanium oxide and/or lead oxide. The amount of the additives of this kind should not, however, exceed 5% by weight. In the following are given in addition the mix compositions for two special glasses which already have been used in the computing of objectives. The glass No. 1 has a refractive index of $n_e=1.7919$ with an Abbé value $v_e$ of 47.2. Glass No. 2 has a refractive index $n_e=1.8150$ with an Abbé value $n_e$ of 45.1.

Glass No. 1

Percent by wt.

| | |
|---|---|
| $SiO_2$ | 2.5 |
| $B_2O_3$ | 30.0 |
| ZnO | 1.0 |
| CdO | 1.5 |
| $La_2O_3$ | 50.5 |
| $ZrO_2$ | 8.5 |
| $Ta_2O_5$ | 4.0 |
| $WO_3$ | 2.0 |

Glass No. 2

Percent by wt.

| | |
|---|---|
| $SiO_2$ | 2.5 |
| $B_2O_3$ | 26.5 |
| ZnO | ---- |
| CdO | 4.0 |
| $La_2O_3$ | 49.0 |
| $ZrO_2$ | 10.0 |
| $Ta_2O_5$ | 6.0 |
| $WO_3$ | 2.0 |

The mixes are preferably melted down in platinum vessels at temperatures of 1250–1300° C. After melting down the refining follows at a temperature of 1350–1400° C. After refining the melt is stirred down to the viscosity required for casting according to the customary casting methods. It can be cast in semi-continuous or continuous processes. The glasses may be tempered satisfactorily by known methods and worked to pressed articles.

We claim:

1. Optical glass having a refractive index of from approximately 1.7595 to approximately 1.8327 and an Abbé value of from approximately 50.0 to approximately 42.9 for pressing articles into desired form by a continuous or semi-continuous process, said glass consisting essentially of from 80%–88% by weight of a base of three constituents, one constituent being lanthanum oxide, a second constituent being at least one of zinc oxide or cadmium oxide, and the third constituent being boric oxide or boric oxide plus silica, the silica being present in an amount from 0% to 5% of the glass mix in which the amounts of the substances lie within a rectangle in a ternary diagram determined by the following points:

| | Percent | | | |
|---|---|---|---|---|
| $SiO_2+B_2O_3$ | 31.5 | 33.5 | 39.0 | 37.0 |
| $La_2O_3$ | 61.0 | 63.6 | 58.1 | 55.5 |
| $ZnO+CdO$ | 7.5 | 2.9 | 2.9 | 7.5 | in which the percentages of any two of the three constituents determine the percentage of the third constituent, and from 12% to 20% by weight of the oxides of zirconium, tantalum and tungsten, the composition containing, based on total weight of ingredients, from 45.5 to 55.4% $La_2O_3$, from 20.8% to 33.9% $B_2O_3$, at least 1% ZnO or at least 1.2% CdO, from 7.5% to 12% $ZrO_2$, from 2% to 7% $Ta_2O_5$, and from 1% to 7.5% of $WO_3$.

2. Optical class of claim 1 having a refractive index of approximately 1.7919 and an Abbé value of approximately 47.2 and having the following composition:

Percent by weight

| | |
|---|---|
| $SiO_2$ | 2.5 |
| $B_2O_3$ | 30.0 |
| ZnO | 1.0 |
| CdO | 1.5 |
| $La_2O_3$ | 50.5 |
| $ZrO_2$ | 8.5 |
| $Ta_2O_5$ | 4.0 |
| $WO_3$ | 2.0 |

3. Optical glass of claim 1 having a refractive index of approximately 1.8150 and an Abbé value of approximately 45.1 and having the following composition:

Percent by weight

| | |
|---|---|
| $SiO_2$ | 2.5 |
| $B_2O_3$ | 26.5 |
| CdO | 4.0 |
| $La_2O_3$ | 49.0 |
| $ZrO_2$ | 10.0 |
| $Ta_2O_5$ | 6.0 |
| $WO_3$ | 2.0 |

4. Optical glass of claim 1 which contains a total amount up to five percent by weight of at least one oxide of the elements magnesium, calcium, strontium, barium, aluminum, titanium and lead.

References Cited

UNITED STATES PATENTS

| | | | |
|---|---|---|---|
| 2,899,322 | 8/1959 | Bromer et al. | 106—47 |
| 3,080,240 | 3/1963 | Geffcken et al. | 106—47 |
| 3,143,432 | 8/1964 | Bromer et al. | 106—47 |

OTHER REFERENCES

De Paolis, "Thorium-Free Borate Glass," vol. 629, O.G. 292 (Dec. 6, 1949).

HELEN M. McCARTHY, Primary Examiner

U.S. Cl. X.R.

106—47, 53; 350—176